US008359239B1

(12) United States Patent
Cook et al.

(10) Patent No.: US 8,359,239 B1
(45) Date of Patent: Jan. 22, 2013

(54) METHOD AND APPARATUS FOR TRACKING MOBILE TRANSACTIONS

(75) Inventors: Scott D. Cook, Woodside, CA (US); Miriam R. Geller, San Francisco, CA (US); Udaiveer S. Mathoda, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1277 days.

(21) Appl. No.: 11/731,517

(22) Filed: Mar. 30, 2007

(51) Int. Cl.
*G06Q 20/00* (2012.01)

(52) U.S. Cl. ........................................... 705/19; 705/16

(58) Field of Classification Search .................... 705/19, 705/16
See application file for complete search history.

(56) References Cited

U.S. PATENT DOCUMENTS

| | | | | |
|---|---|---|---|---|
| 5,649,115 | A * | 7/1997 | Schrader et al. | 705/33 |
| 5,740,271 | A * | 4/1998 | Kunkler et al. | 382/137 |
| 5,771,289 | A * | 6/1998 | Kuzma | 713/153 |
| 6,067,529 | A * | 5/2000 | Ray et al. | 705/24 |
| 6,991,158 | B2 * | 1/2006 | Munte | 235/379 |
| 7,415,431 | B2 * | 8/2008 | Pintsov | 705/32 |
| 7,440,924 | B2 * | 10/2008 | Buchanan et al. | 705/45 |
| 7,558,777 | B1 * | 7/2009 | Santos | 1/1 |
| 7,606,750 | B1 * | 10/2009 | Hoag et al. | 705/35 |
| 7,742,958 | B1 * | 6/2010 | Leek et al. | 705/31 |
| 2002/0016767 | A1 * | 2/2002 | Johnston | 705/40 |
| 2002/0023027 | A1 * | 2/2002 | Simonds | 705/26 |
| 2003/0036918 | A1 * | 2/2003 | Pintsov | 705/1 |
| 2003/0233296 | A1 * | 12/2003 | Wagner | 705/31 |
| 2004/0054592 | A1 * | 3/2004 | Hernblad | 705/15 |
| 2004/0225567 | A1 * | 11/2004 | Mitchell et al. | 705/16 |
| 2004/0243489 | A1 * | 12/2004 | Mitchell et al. | 705/30 |
| 2005/0097046 | A1 * | 5/2005 | Singfield | 705/42 |
| 2005/0144024 | A1 * | 6/2005 | Wojton et al. | 705/1 |
| 2005/0197916 | A1 * | 9/2005 | Newell et al. | 705/26 |
| 2005/0205660 | A1 * | 9/2005 | Munte | 235/379 |
| 2005/0246234 | A1 * | 11/2005 | Munyon | 705/21 |
| 2005/0274792 | A1 * | 12/2005 | Hahn-Carlson et al. | 235/379 |
| 2006/0010063 | A1 * | 1/2006 | Drummond et al. | 705/35 |
| 2006/0085275 | A1 * | 4/2006 | Stokes et al. | 705/26 |
| 2006/0196930 | A1 * | 9/2006 | Hart et al. | 235/380 |
| 2006/0212711 | A1 * | 9/2006 | Tanimoto | 713/178 |
| 2007/0005509 | A1 * | 1/2007 | Spiller et al. | 705/65 |
| 2007/0078761 | A1 * | 4/2007 | Kagan et al. | 705/39 |
| 2007/0156582 | A1 * | 7/2007 | Bagheri | 705/40 |
| 2009/0254476 | A1 * | 10/2009 | Sharma et al. | 705/39 |
| 2012/0185368 | A1 * | 7/2012 | Schloter et al. | 705/30 |
| 2012/0191565 | A1 * | 7/2012 | Blank et al. | 705/26.8 |
| 2012/0197805 | A1 * | 8/2012 | Chung | 705/64 |

OTHER PUBLICATIONS

Receipt Imaging Becomes standard, Radcliffe M. 2005 Business Travel News,22(15) 34-34.*

Concur Introduces Latest enhancement (2011, Jun. 01), Pr Newswire.*

* cited by examiner

*Primary Examiner* — Matthew Gart
*Assistant Examiner* — Harshad Parikh
(74) *Attorney, Agent, or Firm* — Osha Liang LLP

(57) ABSTRACT

A method to submit transaction data using a mobile device involves obtaining a receipt associated with a financial transaction, transmitting a message, based on the receipt, from the mobile device to a transaction management service, wherein the message comprises a mobile device identifier and transaction data associated with the financial transaction, wherein transaction data associated with financial transaction is stored in a repository based on the mobile device identifier, receiving a form, wherein the form is generated based on transaction data associated with the mobile device identifier, and transmitting and synchronizing transaction data from the repository to a financial management software associated with a user of the mobile device.

41 Claims, 8 Drawing Sheets

| | | |
|---|---|---|
| User Identifier 451 | Time Sent 453 | Amount 455 |
| Activity Description 457 | Category 459 | Multimedia Data 461 |

METHOD AND APPARATUS FOR TRACKING MOBILE TRANSACTIONS

BACKGROUND

When items are purchased or services are rendered, a consumer is typically provided a receipt. The receipt serves as a written record of the amount and nature of a transaction. For tax and/or budgetary reasons, receipts are often collected and each amount categorized according to the purpose. The receipts may be submitted as part of an expense report seeking reimbursement for business-related expenses. Further, the receipts may be used as a basis for completing and filing tax forms seeking deductions to either personal or business tax returns. Failure to timely submit and/or retain receipts related to financial transactions can result in financial loss and/or penalties.

Businesses tend to have stringent receipt collection procedures. Procedures exist to allow a business to properly document expenses associated with business-related purposes, which are often tax deductible and/or closely monitored budget categories. Unfortunately, keeping track of and sufficiently categorizing all receipts is not always a simple task. Receipts may be lost, misplaced, destroyed, or otherwise inaccessible. Moreover, even when receipts are accessible, the category for the receipt and other supporting information may be misplaced, illegible, forgotten, or otherwise lost.

Once receipts are presented with a business expense report, such reports are kept to substantiate claims when making financial reports to government and other agencies. The paper reports (and supporting documents), when combined with all other retained documents, require a large amount of storage space or some form of electronic document management. The paper reports are accessible only at the location stored in substantially the same form submitted and can be susceptible to destruction or loss.

In today's active society, most consumers own a mobile device (e.g., a mobile phone, personal digital assistant, a multimedia device, a compact computer, or other mobile electronic device) and carry the mobile device along with them throughout the day. Further, the features and interface provided by the mobile device are relatively simplistic in design and functionality.

SUMMARY

In general, in one aspect, the invention relates to a method to submit transaction data using a mobile device. The method comprises obtaining a receipt associated with a financial transaction, transmitting a message, based on the receipt, from the mobile device to a transaction management service, wherein the message comprises a mobile device identifier and transaction data associated with the financial transaction, wherein transaction data associated with financial transaction is stored in a repository based on the mobile device identifier, receiving a form, wherein the form is generated based on transaction data associated with the mobile device identifier, and transmitting and synchronizing transaction data from the repository to a financial management software associated with a user of the mobile device.

In general, in one aspect, the invention relates to a method to store transaction data submitted using a mobile device. The method comprises receiving a message from the mobile device, wherein the message comprises a mobile device identifier and transaction data associated with a financial transaction, determining whether the mobile device identifier corresponds with a record in a repository, and storing transaction data associated with the financial transaction in the repository based on the mobile device identifier.

In general, in one aspect, the invention relates to a system to store transaction data using a mobile device. The system comprises a wireless infrastructure configured to receive a message, wherein the message comprises a mobile device identifier and transaction data associated with a financial transaction, a repository configured to store the transaction data associated with the financial transaction based on the mobile device identifier, a server, and a message processing center configured to forward the message from the mobile device to the server. The server is configured to determine whether the mobile device identifier corresponds with a record in the repository, and transmit and synchronize transaction data from the repository to a financial management software associated with a user of the mobile device.

Other aspects of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to submitting and tracking transaction data using a mobile device. More specifically, one or more embodiments of the invention relate to methods and systems for using a mobile device to submit transaction data associated with a financial transaction (such as business and/or personal expenses) and storing the transaction data in a manner such that transaction data may be accessed.

Figure 1:
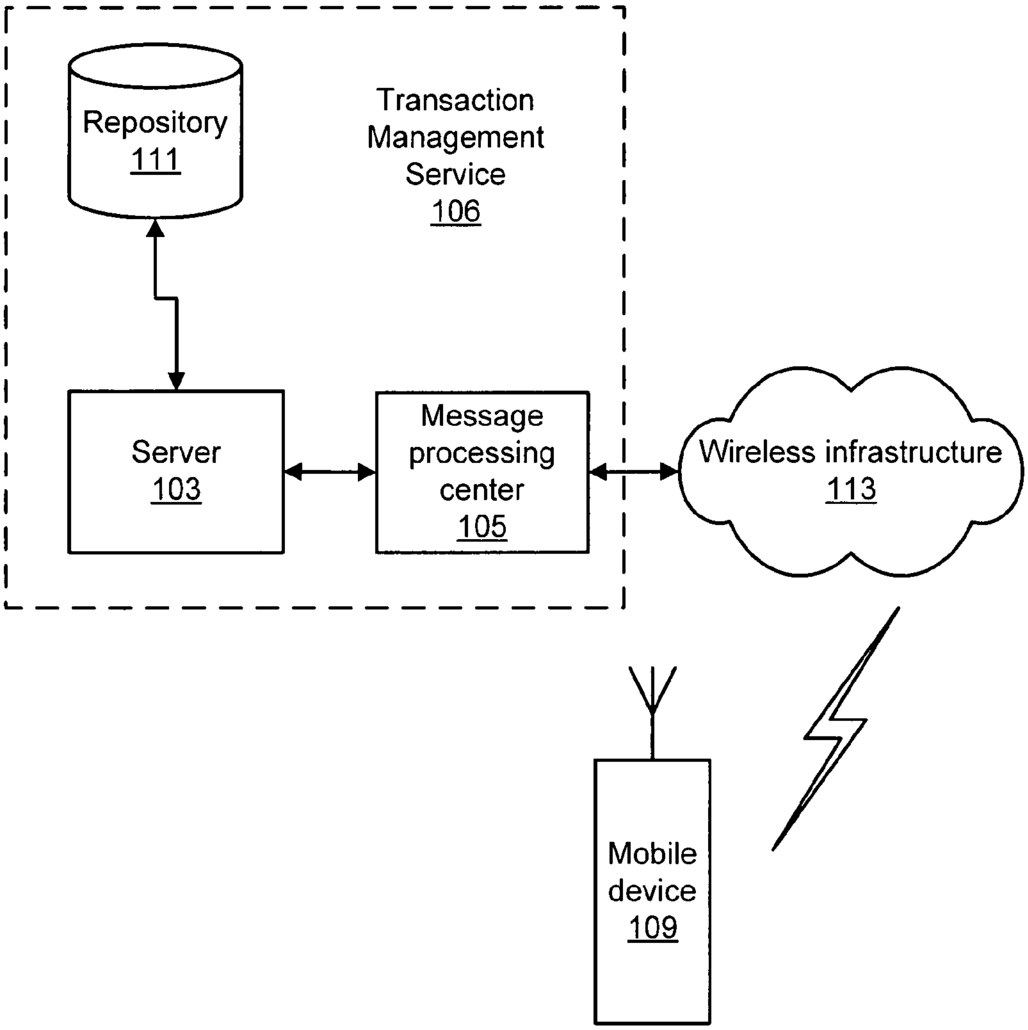
FIG. 1 shows a system for mobile submission and tracking of transaction data in accordance with one or more embodiments of the invention.

FIG. 1 shows a system for mobile submission and tracking of transaction data in accordance with one or more embodiments of the invention. The system includes a server (103), a message processing center (105), a repository (111), and a wireless infrastructure (113). Ultimately, the operation of the message processing center (105) and the wireless infrastructure (113) permits the server (103) to interact with a mobile device (109). In one or more embodiments of the invention, the server (103), message processing center (105), and repository (111) form a transaction management service (TMS) (106), which may be subscribed to and/or accessed by mobile device users to submit and/or track transaction data associated with a financial transaction.

Figure 8:
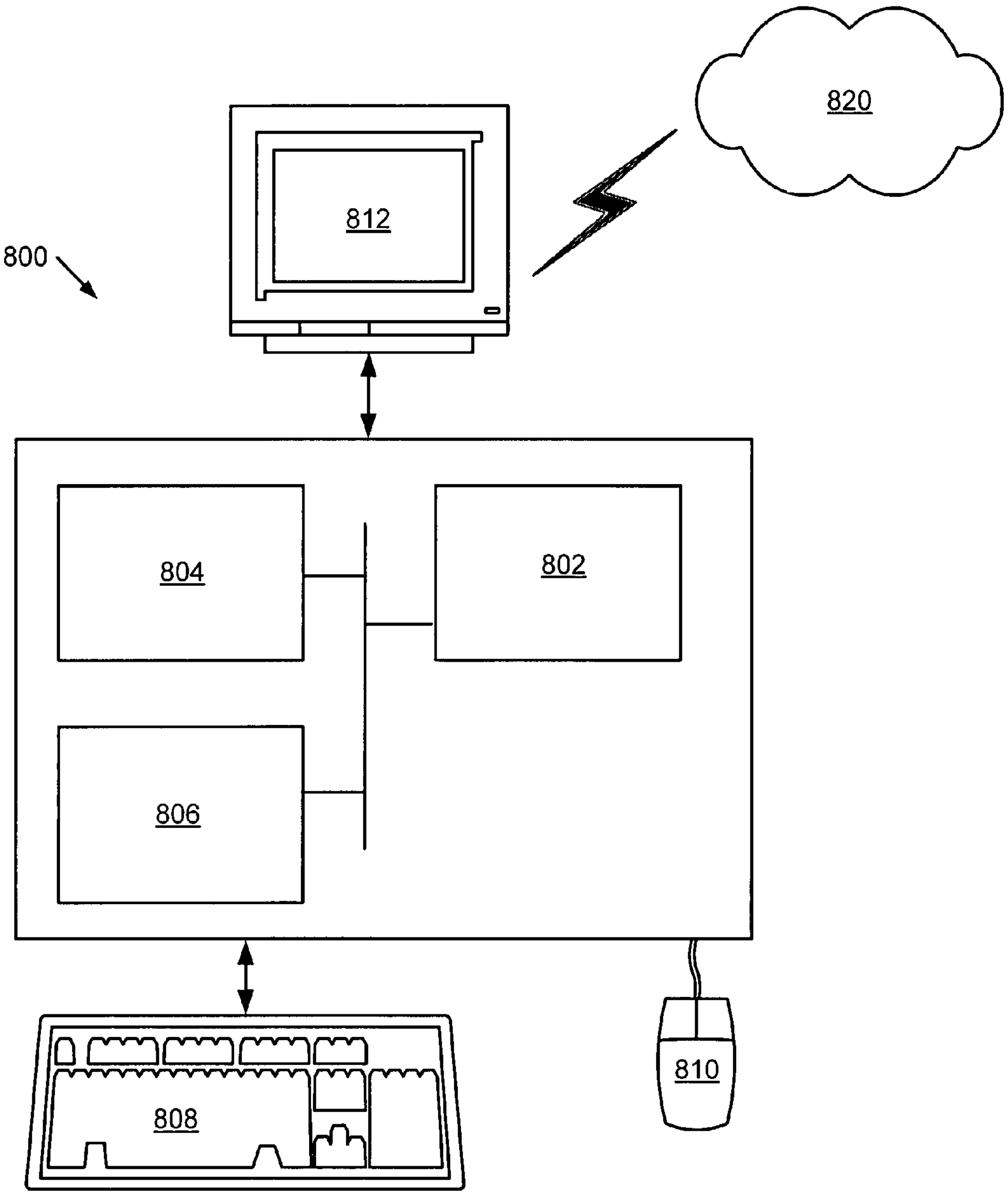
FIG. 8 shows a networked computer system in accordance with one or more embodiments of the invention.

The server (103) may be a networked computer system, such as shown and described below in FIG. 8. The server (103) may receive, send, modify, arrange for storage of, and/or otherwise process messages and/or associated transaction data. The server (103) may also provide additional functionality necessary to perform the invention. For example, the server (103) may interact with a network controlled by a subscriber or an agency to which the subscriber reports financial transactions. Further, the server (103) may interact with a taxing authority, an auditor, or any other authority that validates or characterizes a business's or individual's financial records.

Further, the server (103) may communicate with one or more client machines (not shown) to generate necessary financial forms and/or reports, synchronize with existing financial management software, or other financial activities based on the messages and the associated transaction data.

The repository (111) may support the storage needs of the server (103) and other components necessary to provide functionality to perform the invention. In one or more embodiments of the invention, the repository (111) is a device capable of storing information and retrieving the stored information by interacting with or independently of the server (103). The repository (111) may be, for example, one or more magnetic storage devices, optical storage devices, flash memory, or other similar devices. In one or more embodiments of the invention, the repository (111) is able to index the stored information by various attributes (such as a personal identifier, a mobile device identifier, a taxpayer identifier, currency amount, category, or other identifiers associated with data).

While the invention has been described with a single repository (111), one skilled in the art will appreciate that multiple data repositories may be used to hold all data associated with the server (103), message processing center (105) and/or other component necessary to perform the invention. Likewise, while the repository (111) is depicted as centralized, multiple databases may hold the data in various combinations. Further, the repository (111) often includes data protection and security schemes to protect sensitive data from corruption, theft, attack, destruction, and other forms of intrusion and loss of integrity.

In one or more embodiments of the invention, the message processing center (105) includes one or more computer systems and/or software within a wireless network that provides the routing (i.e., directing messages along a network using hardware devices and/or software components) of all messages, images, files, and/or other digital transmissions. For example, the message processing center (105) may be a mobile server to send transaction data (e.g., expenses or other transaction data) and/or images (e.g., photograph evidence of a receipt, audio description of an expense, or other digital images associated with the transaction data). The message processing center (105) may also be a short message service (SMS) center, a paging router, or other wireless messaging center. Further, the message processing center may be a stand-alone application for use on mobile devices.

One skilled in the art will appreciate that while the server (103) and message processing center (105) are shown separately in FIG. 1, both could exist on the same machine and/or portions of each may be distributed across a distributed system. Further, while the server (103) and message processing center (105) are shown as single components, one skilled in the art will appreciate that multiple machines and/or instances of software may be used to provide the necessary functionality to perform the invention.

In one or more embodiments of the invention, the wireless infrastructure (113) includes one or more transceivers cooperating to facilitate wireless communications to wireless devices. The wireless infrastructure (113) may include one or more routers, switches, microwave links, base stations, optical fibers, or other similar networking hardware or software components. For example, the wireless infrastructure may be a paging network, a cellular network, etc. In one or more embodiments of the invention, the wireless infrastructure (113) may associate any message received from a mobile device with a mobile device (109) identifier of the mobile device (109).

In one or more embodiments of the invention, the mobile device (109) is a wireless device capable of communicating with the wireless infrastructure (113). The mobile device (109), as shown and described in detail below in relation to FIG. 2, may be a mobile phone, a paging device, a fixed wireless phone, or other wireless communication device.

Figure 2:
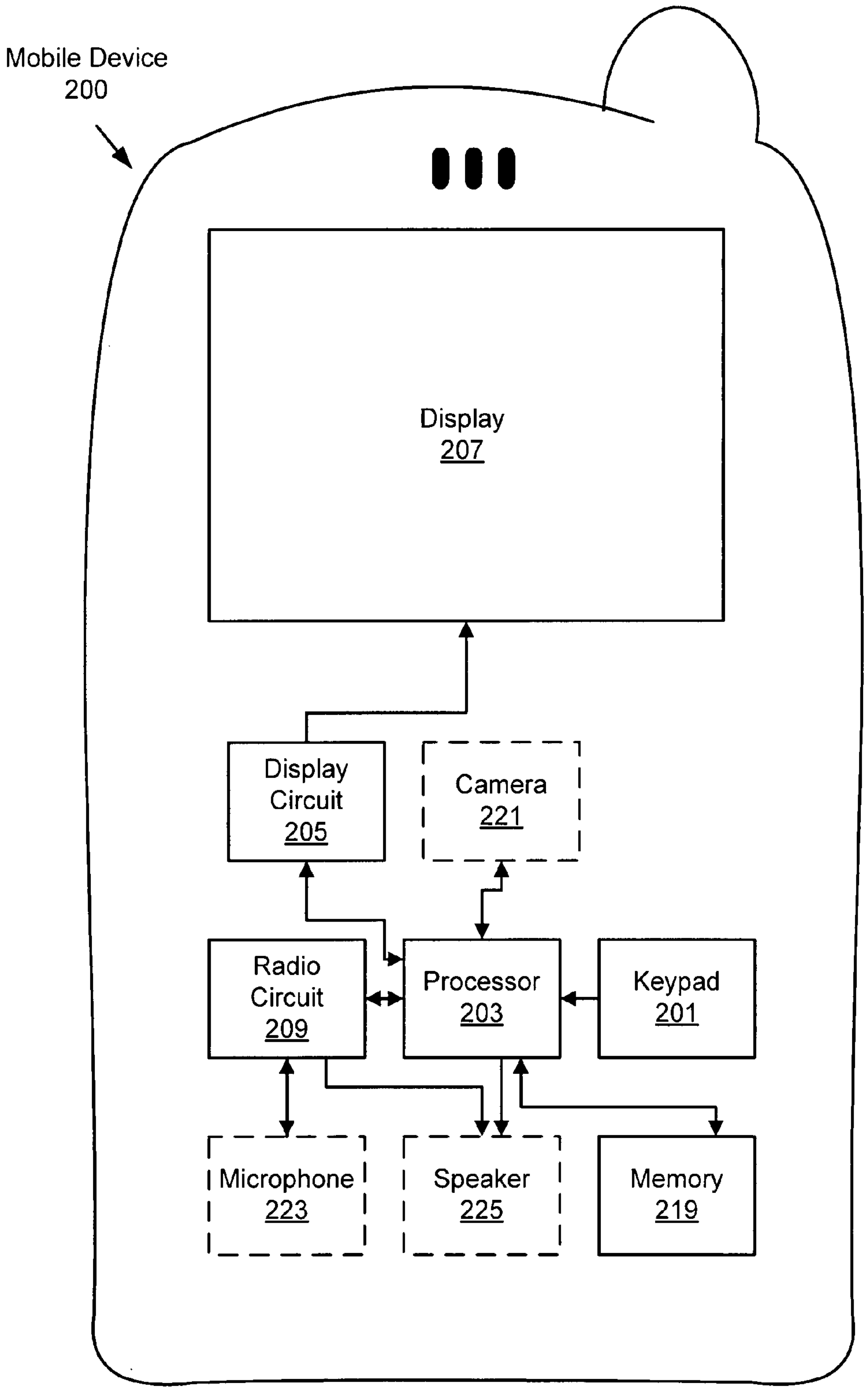
FIG. 2 shows a mobile device in accordance with one or more embodiments of the invention.

FIG. 2 shows a mobile device (200) in accordance with one or more embodiments of the invention. In one or more embodiments of the invention, the mobile device (200) includes a keypad (201) that permits a user to enter keystrokes including numeric, alphabetic, and other characters. The keypad (201) sends signals to a processor (203). The processor (203) may convert the keystrokes into a standard digital representation, for example, America National Standard Code for Information Interchange (ASCII) text. To facilitate feedback to a user, a display circuit (205) drives a display (207) to display inputs such as a message to be transmitted, a message received, etc.

The processor (203) may retain text (or any other necessary information) in a memory (219). In one or more embodiments of the invention, when a user instructs the processor (203) to dispatch a message, a radio circuit (209) is used to transmit the message or perforin any other communication activities related to the mobile device. For example, the radio circuit (209) may be coupled to a wireless infrastructure (e.g., the wireless infrastructure (113) in FIG. 1) allowing an authorized user to communicate across the wireless infrastructure. In addition, some configurations of a mobile device (200) may include optional components, such as a camera (221), a microphone (223), and a speaker (225).

In one or more embodiments of the invention, the camera (221) is a device capable of capturing and processing images with at a resolution as low as 0.3 megapixel and/or as high as necessary to capture the necessary clarity of a desired image. The mobile device user may activate the camera (221) by using the keypad (201) of the mobile device. To obtain multimedia data, such as a digital image, the user may point the lens of the camera (221) towards the desired object and then press a button on the camera (221) to open a shutter (not shown) associated with the camera. In one or more embodiments of the invention, the processor (203) may compress and/or otherwise process the multimedia data and store such data to the memory (219) for possible viewing and/or later transmission. The display (207) (and, to the extent necessary, the processor (203), radio circuit (209), and display circuit (205)) of the mobile device (200) may be used to view and/or transmit the image data.

Further, the mobile device (200) includes functionality to obtain and store audio files using the microphone (223). The mobile device user may activate the microphone (223) by using the keypad (201) of the mobile device. To obtain audio files using the microphone (221), the user speaks into the activated microphone (223) for the intended time period and then stops the recording by using the keypad (201) to deactivate the microphone (221). The processor (203) may compress and otherwise process audio data and store such data to the memory (219) for possible later sampling and/or transmission. The speaker (225) (and, to the extent necessary, the processor (203) and radio circuit (209)) of the mobile device (200) may be used to sample and/or transmit the audio data. In one or more embodiments of the invention, expense information is recorded on a mobile device as the transactions takes place and then the audio file is send to a server. Alternatively, the user of the mobile device may called into a predefined phone number to record a message. The message could be automatically converted to a MP3 file (or similar format), which is accessible to the mobile device user. Further, interactive voice recognition could be used to parse out the information from the audio data.

In one or more embodiments of the invention, the mobile device (200) may be authorized to access the wireless infrastructure (113) in FIG. 1. The mobile device (200) may transmit a mobile device identifier (not shown) as part of a handshake algorithm with a wireless infrastructure to complete authentication of the mobile device (200) to a wireless infrastructure. In one or more embodiments of the invention, the mobile device identifier is a unique identifier (e.g., a telephone number, serial number, an international mobile subscriber identity (IMSI) or other unique numbering scheme) assigned by the wireless infrastructure provider or entities cooperating with the wireless infrastructure provider.

In one or more embodiments of the invention, the mobile device (200) may be designed to use multiple subscriber identity modules and/or multiple mobile device identifiers. In such a configuration, a user may select one of the several subscriber identity modules as active. Consequently, the user assigns the mobile device identifier of the active subscriber identity module as the mobile device identifier to be sent with messages sent via the mobile device (200).

Figure 3:
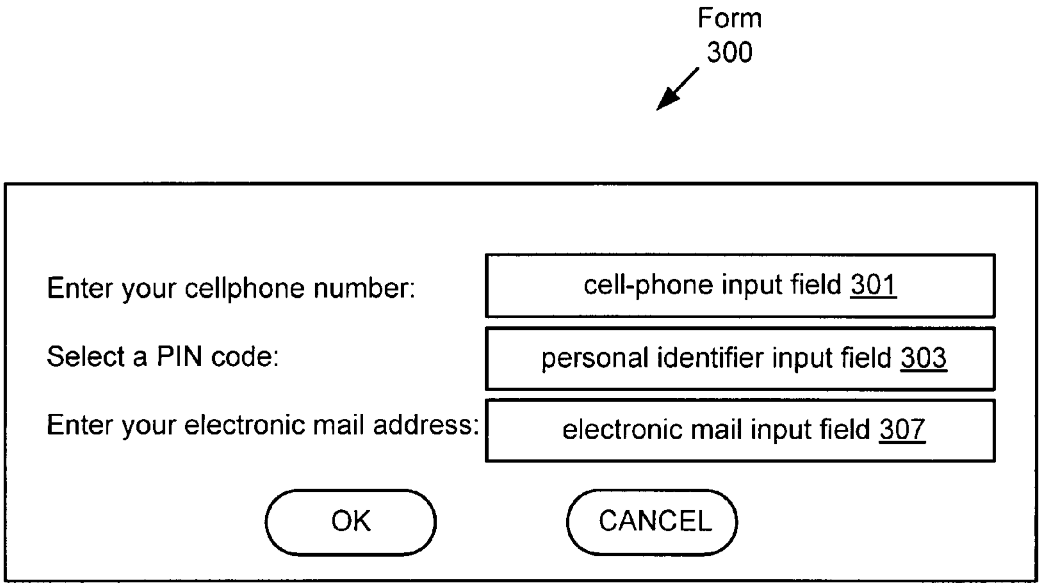
FIG. 3 shows a form displayed on a mobile device in accordance with one or more embodiments of the invention.

FIG. 3 shows a form (300) displayed on a mobile device in accordance with one or more embodiments of the invention. The form (300) may be used to facilitate a user subscribing to a transaction management service (TMS) by adding a mobile device identifier to a repository. By adding the mobile device identifier to the repository, the mobile device (and user) associated with that mobile device identifier may transmit (e.g., submit and receive) transaction data to the TMS using the mobile device.

Initially, a mobile device identifier is input into a cellphone input field (301). The mobile device identifier may be input by the user, obtained from stored configuration files, obtained from the system of the mobile device itself, or various other ways of providing input to a filed. As discussed above, the mobile device identifier may be a telephone number (or other identifier) associated with the mobile device. Next, the user may optionally establish a personal identifier in the personal identifier input field (303). The personal identifier may be the user's name, nickname, common user identification, chat room name, etc. In addition, the user may provide an electronic mail address in the electronic mail input field (307).

The user may complete entry and submit the form (300) to the TMS (e.g., a server in the TMS). Consequently, the TMS may validate the operation of the mobile device by sending an electronic message to a mobile device identified in the cellphone input field (301). Further, more or less validation, authentication, and initialization steps may be performed by the TMS depending on the specific needs and established policies. In fact, in one or more embodiments of the invention, no subscription and/or initialization procedure is required. Instead, a mobile device user is able to use the service to only store the transaction data. However, a subscription and/or an initialization procedure is required to retrieve the data.

Figures 4A, 4B:
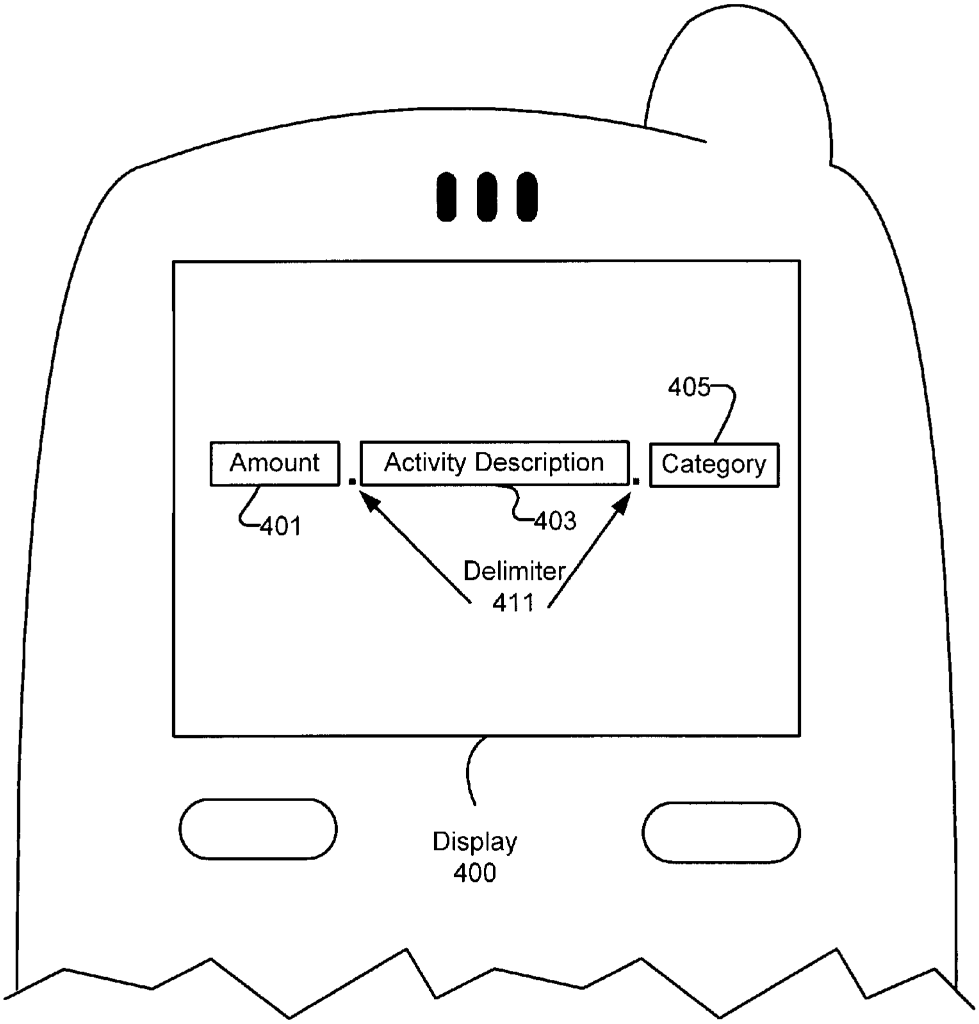
FIG. 4A shows an exemplary message format in accordance with one or more embodiments of the invention.
FIG. 4B shows a format for transaction data in accordance with one or more embodiments of the invention.

FIG. 4A shows an exemplary message format in accordance with one or more embodiments of the invention. The message format may be used by the user device to communicate transaction data associated with one or more financial transactions to the TMS. While this example uses a text-based command interface format, any sort of scheme may be used to transmit data including, but not limited to, a SMS Form, an encoded HyperText Markup Language (HTML) web page, etc.

As shown in FIG. 4A, the message format may be a form established by a server for validating messages sent from a mobile device. A user may compose a message to the display (400). The message may include a currency amount (401), an activity description (403), and a category (405). Further, while not shown, the message may include the type of payment (e.g., credit card, debit, cash, etc.).

A currency amount may be a decimal number representing an amount in a particular currency, such as dollars, euros, pesos, among others. In this example, the currency amount is followed by a delimiter (411). A delimiter is a character selected by a server operator as a character unlikely to be used as a currency amount (401), an activity description (403), or a category (405). A sequence of characters may also serve as a delimiter. For example, delimiters may be in the form of extended markup language (XML) tags. In the present example, the delimiter is a period. However, one skilled in the art will appreciate that the invention is not limited to such a delimiter.

The activity description (403) is a text description that a user enters as a summary or memo of a corresponding financial transaction. Some activity descriptions may be, for example, "Tuesday lunch", "client golf outing", "dinner and drinks, Larry, Curly, and Marvin."

The category (405) is a text description corresponding to a grouping established by the user, a business entity, a governmental body, or other entity interested in tracking the type of expenditure. The category may be, for example, "meals", "travel", or "business entertainment." The category may be further categorized as taxable, non-taxable, etc.

FIG. 4B shows a format for transaction data in accordance with one or more embodiments of the invention. In one or more embodiments of the invention, the transaction data is stored as a data structure (e.g., array, records, linked list, tree, queue, stack, graph, etc.). The data structure may include several fields (or records) of data and be sent across a network (e.g., a wireless infrastructure (113) in FIG. 1) in the form of a message. For example, fields (or records) for the data structure shown in FIG. 4B may be a user identifier (451), time sent (453), an amount (455), an activity description (457), a category (459), and multimedia data (461). Additionally, location (not shown) may be included as a filed (or record) within the data structure. In one or more embodiments of the invention, the location field (or record) includes location information retrieved from a global positioning satellite (GPS) system and/or a directory of entities associated within a certain distance of the location information.

In one or more embodiments of the invention, the user identifier (451) is a unique identifier of the user who submits transaction data. For example, the user identifier (451) may be a mobile device identifier, and/or a taxpayer identifier, as described above. The time sent (453) is a time that a user either attempted to send the message or the time that the mobile device sent the message. In one or more embodiments of the invention, the time sent (453) may include the time of day, time zone information, and/or the date. The amount (455) may be the currency amount, as described above. The activity description (457) may be a textual description of the expenditure (e.g., “client golf outing”), as described above. The category (459) is a grouping for tracking the type of expenditure (e.g., a business entertainment), as discussed above. Multimedia data (461) may include of one or more images, one or more audio files, and/or other multimedia files obtained by a mobile device (e.g., an image of attendees at a business lunch before the golf outing and/or the receipt for the club rental for the golf outing (including a bar code embedded on the receipt)).

In one or more embodiments of the invention, the data structure may compress, correct, and introduce redundancy checks to each field (or record) prior to transmission in accordance with a user input. Further, the data structure may be packaged for better transmission based on a particular format of transmission (e.g., SMS, TCP/IP, or other transmission methods). Consequently, each field (or record) sent may vary, as compared to the message composed and displayed. In other words, the message may be adjusted for robust wireless transmission.

Figure 5:
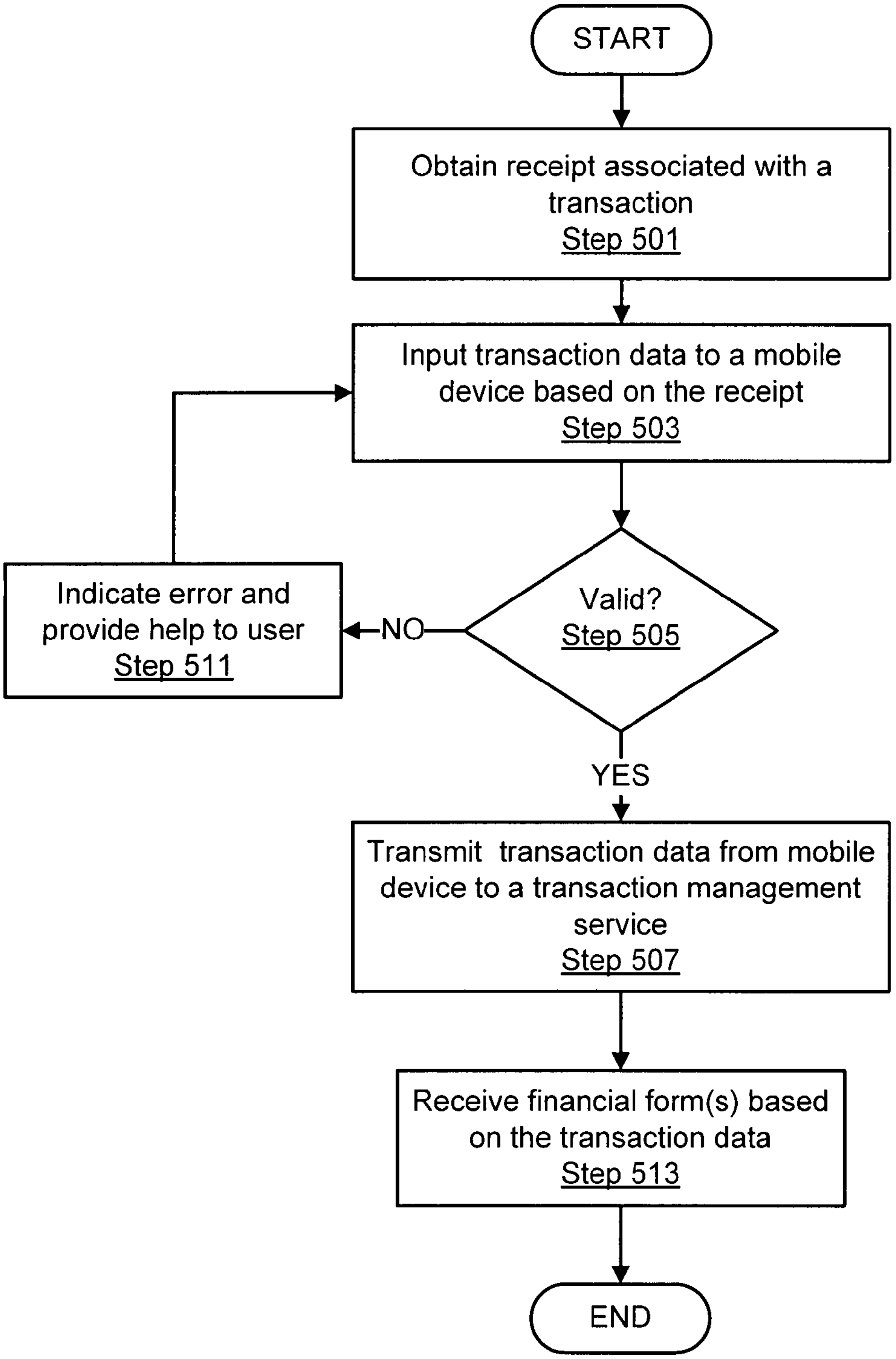
FIG. 5 shows a flowchart of submitting transaction data in accordance with one or more embodiments of the invention.

FIG. 5 shows a flowchart of submitting transaction data in accordance with one or more embodiments of the invention. Initially, a consumer purchases a good or service and obtains a receipt (i.e., some record of that transaction) (Step 501). Typically, the receipt is paper; however, other forms are possible such as electronic, holographic, wireless transmission directly from a point of sale device, a bar code image in the form of a paper receipt, etc. In one or more embodiments of the invention, the receipt includes transaction data, such as the items purchased, the amount, location, time, and date of the purchase, the merchant, the address of the merchant, the date paid, the form of payment, the tax paid, and other items typically found on a receipt.

Additional transaction data may be obtained as multimedia data using the mobile device. Multimedia data may be obtained by photographing one or more images of items associated with the transaction or making audio recordings of details regarding the transaction. For example, a photographic image of the receipt itself, the product, the service being performed, the location of purchase (e.g., restaurant logo, the parties involved in the transaction may be taken using a mobile device. Similarly, an audio recording may be made of the circumstances surrounding a purchase, such as promises made by a salesperson, conditions of the transaction, candid thoughts of the experience, details supporting the transaction being a properly deductible expense, or other audio sound bites associated with the transaction.

Once the transaction data has been obtained, the transaction data is input to a mobile device based, in part, on the receipt (Step 503). The necessary transaction data based on the receipt is input to the mobile device. Additional transaction data may already reside on the mobile device, such as electronic data, multimedia data, etc. In one or more embodiments of the invention, the transaction data is combined in a form prescribed by the TMS. For example, the transaction data may be submitted as a simple text command using a command interface (e.g., SMS, SMS form, or other suitable methods to transport text). Additionally, the simple text command interface may be supplemented by a form interface allowing the transmission of both text and multimedia data. Alternatively, the transaction data may be submitted via a web page interface using standard markup language, which supports the transmission of both text and multimedia data.

Regardless of what format is used for transmitting the transaction data, a determination is optionally made whether the transaction data prepared for transmission on a mobile device is valid for the particular format (Step 505). If not valid, an error is indicated to the mobile device user, who is provided with help to make the data valid (Step 511) and the user again attempts to enter transaction data using the proper format in Step 503 until the transaction data is proper or the attempt is cancelled, in accordance with one or more embodiments of the invention. Help may be provided in a variety of forms. For example, the help message may include a list of valid message formats and/or permit a user to view the message formats on a display of the mobile device.

If the transaction data is deemed valid (Step 505), then the transaction data is optionally transmitted from the mobile device to the TMS (Step 507). In one or more embodiments of the invention, the transaction data proceeds along the wireless infrastructure as a message, in the form a packet consistent with the format used by the mobile device. The TMS (specifically, the message processing center and/or server) recognize the message and processes the transaction data to be later stored and accessed using a mobile identifier associated with the message.

In summary, a mobile device user or consumer may be regularly collecting transaction data, in the form of receipts and/or multimedia data. Thus, a user may, with a photograph of a receipt and some keystrokes, transmit a contemporaneous record of business activity to a stand-alone server or one that is part of a TMS.

Finally, one or more financial forms (based on the transaction data maintained in the TMS) are received by a mobile device user (Step 513). The financial form may a simple confirmation receipt or a fully completed and complex tax form, which is ready to file with the appropriate taxing authority.

In one or more embodiments of the invention, a business expense reimbursement form is received by the mobile device user. In this example, the business expense reimbursement form includes the various transaction data collected by a mobile device user over a month’s time. The business expense reimbursement form may include all the necessary information from the receipts as well as multimedia data to fully support the business justification for the expense.

Because of the ease of using a mobile device to supply the transaction data, the business expense reimbursement form includes all eligible expense (i.e., no need for paper receipts, thus no “misplaced receipts”) with sufficient justification and clarity for immediate submission and approval. Further, the receipt includes a time stamp and all necessary support to qualify as proven contemporaneous record for unquestioned authenticity by the tax authorities and auditors. Further, the business expense reimbursement form may be submitted in digital form resulting in saved storage space and a more permanent record of the report, which is easily searched for and retrieved. Further, the digital nature of the business expense reimbursement form allows additional supporting information to be maintained for easy access to audit information for a specific period of time. Further, because the information is digitally maintained, the transaction data may be shared and synchronized with personal and/or business financial management software.

Figure 6:
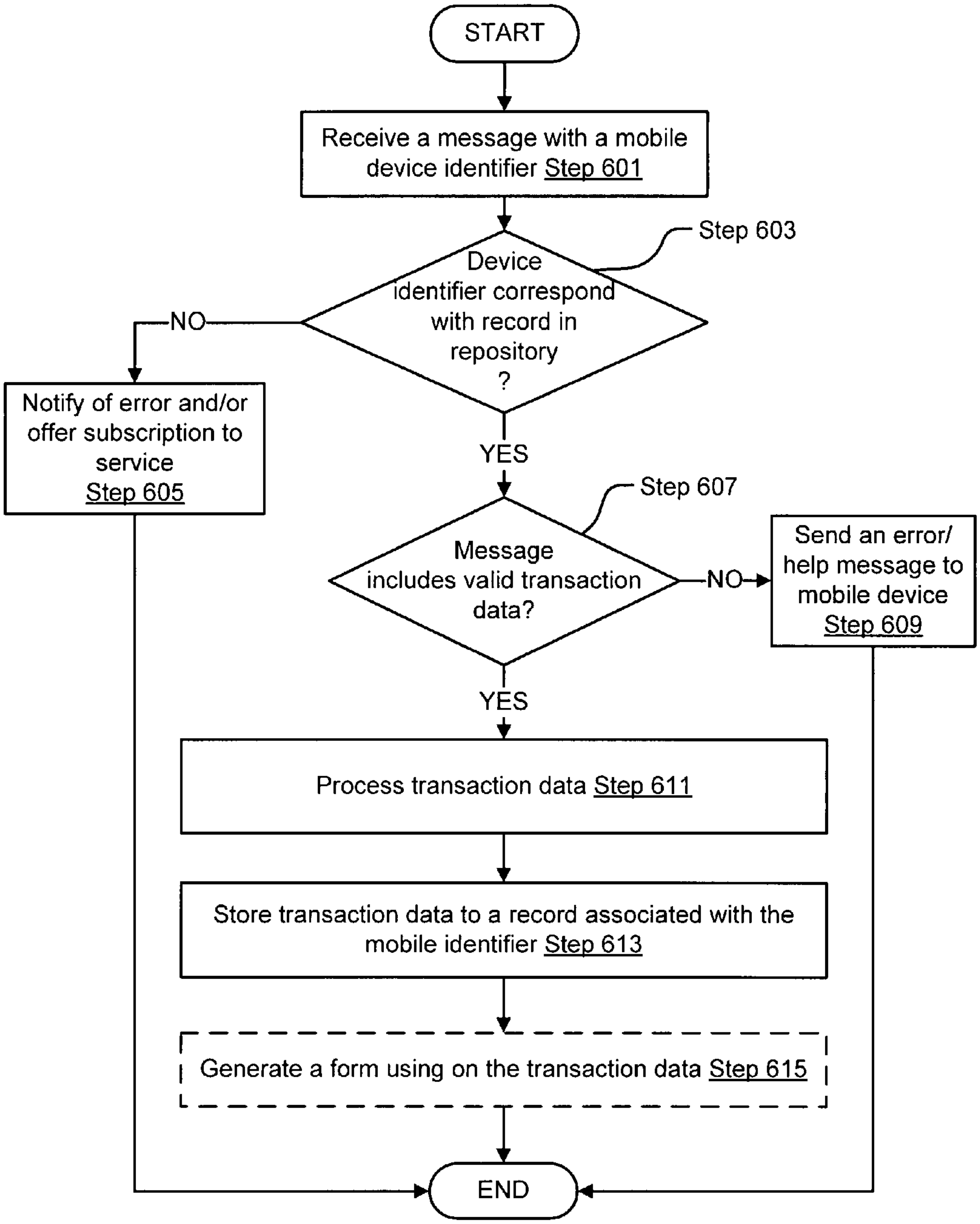
FIG. 6 shows a flowchart for receiving and processing transaction data in accordance with one or more embodiments of the invention.

FIG. 6 shows a flowchart of an example of steps used to receive and process transaction data in accordance with one or more embodiments of the invention. Initially, a message, with a mobile device identifier is received after being sent by a mobile device (Step 601). In one or more embodiments of the invention, the message arrives from a wireless infrastructure into the TMS. Specifically, the message may be apprehended by the message processing center.

At this point, the mobile device identifier of the message is examined to determine whether the identifier corresponds with a record in the repository (Step 603). As described above, the message device identifier is part of the record stored in the repository. By simply examining the record, the mobile device identifier is obtained. A query on the data contained in the repository is then performed to determine whether a record matching the identifier exists.

If the device identifier is not found in the repository, the mobile device user is notified of the error and/or offered subscription to the TMS (Step 605). Alternatively, the mobile device user is allowed to enter the information, which is stored into the repository using a unique identifier of the mobile device (e.g., a mobile device identifier, a license number, a serial number, or other uniquely identifiable number or alphanumeric identifier). The mobile device user is then directed to a location to retrieve the data, such as a website, online service, etc. Next, a determination is made whether the message includes valid transaction data (Step 607).

If the message does not include valid transaction data, an error/help message is sent to the mobile device (Step 609). As described above, the error/help message may include a listing of the field types expected and a brief description of the valid contents of each field. Further, the help message may include instructions explaining how to properly format a message by, for example, prompting the user with commonly used words and phrases when partial or other fragmentary entries are made. Generally, the mobile device user is required to resubmit the message. However, in some cases, a server associated with the TMS may correct and modify received entries to compensate for spelling errors upon receiving a message.

If the message received from the mobile device is valid, the transaction data is processed (Step 611). In one or more embodiments of the invention, the transaction data is extracted from the message and processed within the TMS by temporarily storing each record or text field containing transaction data in memory, while stripping out any delimiters or unnecessary information. Processing may also include appending transaction data to a file already existing in a repository as indicated by matching the mobile device identifier for both messages. In one or more embodiments of the invention, the multimedia data may also be processed. For example, text in a photograph may be converted to ASCII characters using optical character recognition or an audio file may be converted to text using speech-to-text conversion. Once recognized, multimedia data may also be added to existing files (in a similar manner as described above) or maintained as separate files associated with mobile device identifier. In one or more embodiments of the invention, readable data within multimedia data (e.g., a point of sale identifier embedded in a bar code or two dimensional bar codes appearing on a receipt) may be separated from the non-readable portion.

Next, transaction data is stored to a record associated with the mobile identifier (Step 613). In one or more embodiments of the invention, the record is the same record found in the repository at Step 603. All the transaction data associated with the mobile identifier is stored to the record by appending the transaction data to the record or using other more elaborate schemes for organizing data known to those skilled in the art.

Using on the stored transaction data, a form is generated (Step 615). As described above, in one or more embodiments of the invention, the form may be a financial form. The financial form may be a form confirming receipt of the transaction data and/or a fully completed schedule of a tax form, which is ready to file with the tax return of the mobile device user. Additionally, the financial form is a business expense report.

In one or more embodiments of the invention, the forms may be a summarized version of the transaction data presented in reports sorted by indexed attributes (e.g., amount, category, time sent, mobile device identifier, taxpayer identifier, personal identifier, etc.) maintained by the data structure storing the transactional data. The reports may be requested and/or provided to the user of the mobile device, the owner of the mobile device, a business related to the transaction, the employer of the user, the service provider, or other interested parties. Once generated by the TMS, the form may be transmitted to the mobile device user (not shown).

In one or more embodiments of the invention, the generated form may be presented in various ways, including displaying on a website, downloading the transaction data and/or form into a financial management software application for display and/or analysis, transferring the transaction data and/or form to a tax preparation software, etc. Further, the transaction data and/or form downloaded or transferred to one application may, in turn, be transferred to one or more application for display and/or analysis.

Figure 7:
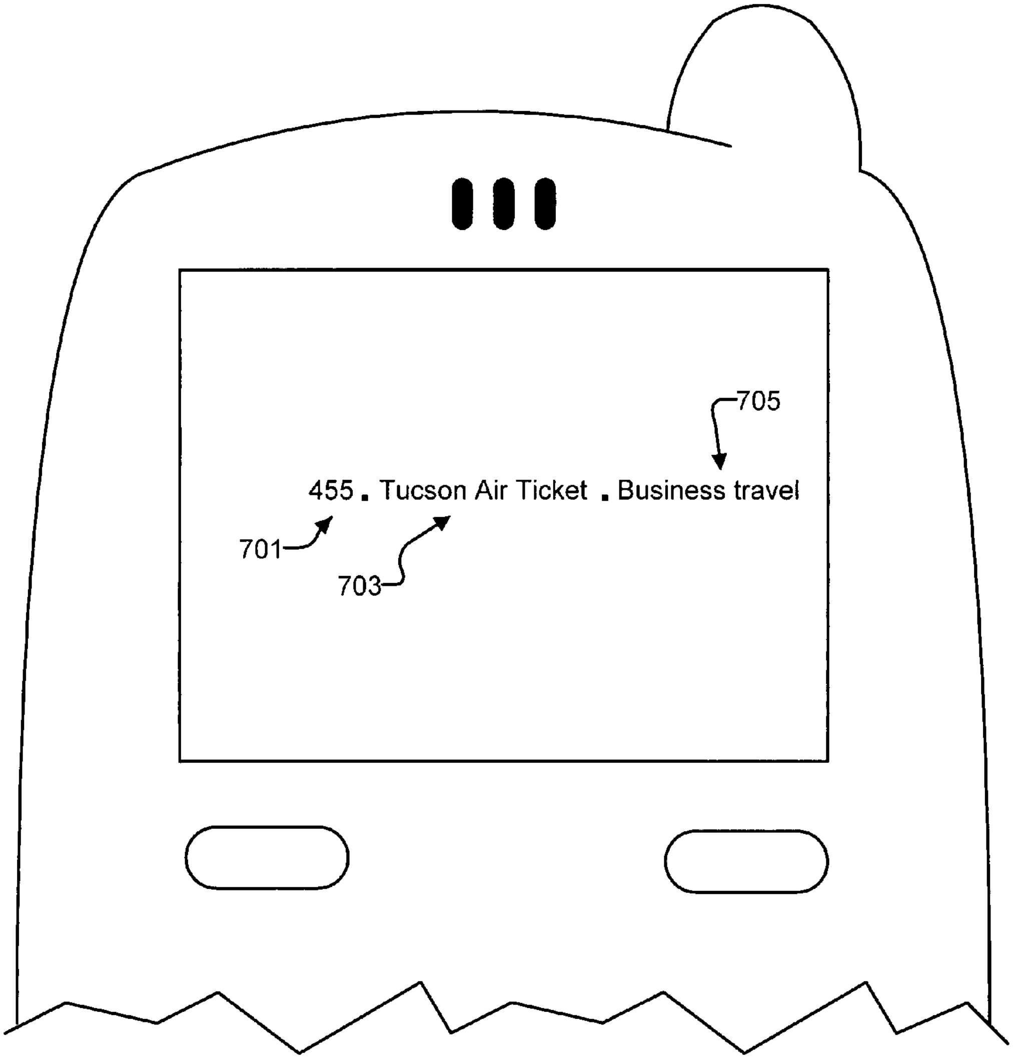
FIG. 7 shows a mobile device submitting an expense in accordance with one or more embodiments of the invention.

FIG. 7 shows an exemplary display on a mobile device in accordance with one or more embodiments of the invention. In the example shown, the mobile device user has entered transactional data consistent with the format described in FIG. 4A. Specifically, the user entered an amount (i.e., "455" (701)), an activity (i.e., "Tucson Air Ticket" (703)), and a category (i.e., "Business Travel" (705)) using the keypad on the mobile device.

Gathered from an airline ticket receipt, transactional data (e.g., amount, activity, and category) provides the basis for the text entered into the three fields of the delimited message shown on the display screen (700). As shown, the fields (701, 703, 705) are separated by the delimiter "." or a period. Additional message formatting may be performed using more advanced mobile devices. For example, multimedia data such as a photographic image of the ticket and the business travel companions as well as an audio file indicating the business purpose of the trip to Tucson and the names of the travel companions shown in the photograph, may be included as part of the message.

In one or more embodiments of the invention, the inputted text associated with the transaction is packaged into messages with extensible markup language (XML) headers and other wrappers that facilitate web service messaging and function calls. The packaged message is then sent from the mobile device to the server. Alternatively, web services definition language (WSDL) interface packet, in conjunction with Simple Object Access Protocol (SOAP), HyperText Transfer Protocol (HTTP) GET/POST operation, and optionally Multipurpose Internet Mail Extensions (MIME) may be used to transmit the message to the TMS.

Thus, a user, who may be outside his or her normal work environment, may use a mobile device, such as a mobile phone, to capture transactional data (e.g., data associated with a financial transaction, such as an expense) and submit such data to a remote system or server. The remote system or server collects the transactional data and associates the data with the user. The server may also summarize transactions together.

Moreover, as part of the transactional data, the server may collect multimedia data sent from the user. The multimedia data may further substantiate the circumstances of each transaction. In addition, the multimedia data may permit a selection of an alternate category for associating with a transaction. More importantly, the multimedia data may be an acceptable business record and form a backup to (or replace) paper records now customarily required to validate reported transactions.

Further, in one or more embodiments of the invention, data entry is practically eliminated resulting in the timely submission and improved accuracy of expense reports. Collection of data facilitated by a mobile device is able to reduce data entry by facilitating the content for data fields of the device using information already available to the mobile device through system resources of the device itself or saved configuration files stored on (or accessible by) the device. The content may include such items as the date, the time, the name of the employee, the signature of the employee, the location of where the expense was made (i.e., the retail establishment, restaurant, hotel, internet address of an online merchant, or other entity associated with the location) or other content to complete a data field. Data entry may also be reduced by using the multimedia capabilities of the mobile device, such as a camera, microphone, etc. to provide the content by leveraging known optical character recognition and/or voice recognition technologies. For example, a user of a mobile device takes a picture of a receipt at a restaurant and speaks into the mobile device with the names of the individuals attending the meal. The invention captures the image and sound into multimedia data using the mobile device, which also includes functionality to translate the printed receipt and audio directly into the proper data fields on an expense report, which is then (upon approval by the mobile device user) automatically dated, signed, and sent to the accounting department using the default settings of the mobile device.

The invention may be implemented on virtually any type of computer system, regardless of the platform being used. FIG. 8 shows a networked computer system in accordance with one or more embodiments of the invention. The networked computer system (800) includes a processor (802), associated memory (804), a storage device (806), and numerous other elements and functionalities typical of a computer (not shown). The networked computer (800) may also include input means, such as a keyboard (808) and a mouse (810), and output means, such as a monitor (812). The networked computer system (800) is connected to a local area network (LAN) or a wide area network (e.g., the Internet) (not shown) via a network interface connection (not shown). Those skilled in the art will appreciate that these input and output means may take other forms.

Further, one or more elements of the aforementioned computer system (800) may be located at a remote location and connected to the other elements over a network. Further, the present invention may be implemented on a distributed system having a plurality of nodes, where each portion of the invention may be located on a different node within the distributed system. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing tax-related data of a user using a mobile device comprising a processor, the method comprising:

obtaining a first electronic image of a receipt for a financial transaction, wherein the receipt comprises a financial amount corresponding to a tax-related expense of the user;

obtaining a second electronic image of at least one person involved in the financial transaction;

receiving, by the processor of the mobile device and from the user, input identifying a deduction category for the financial amount;

transmitting, using the processor of the mobile device, a message comprising the financial amount, the deduction category, the first electronic image, and the second electronic image to a transaction management service (TMS), wherein the TMS calculates a tax deduction amount for the deduction category based on the financial amount, wherein the TMS populates a field on a tax form for reporting the tax-related expense with the tax deduction amount, and wherein the TMS stores the second electronic image as support information for the financial transaction;

displaying, using the processor of the mobile device and prior to filing the tax form with a taxing authority, the tax form populated with the tax deduction amount on a display screen of the mobile device; and obtaining, by the processor of the mobile device and from the user, an approval of the tax form populated with the tax deduction amount.

2. The method of claim 1, further comprising:

receiving, by the mobile device, a business reimbursement form comprising a summary of a plurality of tax-related expenses of the user transacted over a pre-defined time period.

3. The method of claim 1, further comprising:

receiving, after transmitting the message and by the mobile device, a confirmation of receipt from the TMS.

4. The method of claim 1, wherein the deduction category is business expenses.

5. The method of claim 4, wherein the tax form lists a plurality of tax deductions related to the deduction category.

6. The method of claim 1, further comprising:

receiving, by the mobile device, a plurality of transaction data including the financial amount.

7. The method of claim 6, wherein the message further comprises the plurality of transaction data.

8. The method of claim 6, further comprising:

synchronizing the plurality of transaction data to a financial management software associated with the user.

9. The method of claim 1, wherein transmitting the message comprises submitting the message by short message service.

10. The method of claim 1, wherein transmitting the message comprises submitting the message using a web page.

11. The method of claim 1, wherein the message further comprises an activity description.

12. The method of claim 1, wherein the message further comprises multimedia data associated with the tax-related expense.

13. The method of claim 12, wherein multimedia data comprises a point of sale identifier.

14. The method of claim 1, further comprising:

recording, by the mobile device, an audio file, wherein the message further comprises the audio file.

15. The method of claim 1, further comprising:

recording, by the mobile device, a video file, wherein the message further comprises the video file.

16. The method of claim 1, further comprising:

subscribing to the TMS using a mobile device identifier and a user identifier.

17. The method of claim 1, further comprising:

generating an expense reimbursement form based on the message.

18. A computer-readable storage medium storing a plurality of instructions for managing tax-related data of a user of a mobile device, the plurality of instructions comprising functionality to:

obtain a first electronic image of a receipt for a financial transaction, wherein the receipt comprises a financial amount corresponding to a tax-related expense of the user;

obtain a second electronic image of at least one person involved in the financial transaction;

receive, using the mobile device and from the user, input identifying a deduction category for the financial amount;

transmit, using the mobile device, a message comprising the financial amount, the deduction category, the first electronic image, and the second electronic image to a transaction management service (TMS), wherein the TMS calculates a tax deduction amount for the deduction category based on the financial amount, wherein the TMS populates a field on a tax form for reporting the tax-related expense with the tax deduction amount, and wherein the TMS stores the second electronic image as support information for the financial transaction;

display, prior to filing the tax form with a taxing authority, the tax form populated with the tax deduction amount on a display screen of the mobile device; and obtain, by the mobile device and from the user, an approval of the tax form populated with the tax deduction amount.

19. The computer-readable storage medium of claim 18, wherein the deduction category is business expenses.

20. The computer-readable storage medium of claim 18, wherein the message further comprises an activity description.

21. The computer-readable storage medium of claim 18, wherein the message further comprises an audio file with a description of a financial transaction associated with the tax-related expense.

22. The computer-readable storage medium of claim 18, wherein the message further comprises a video file.

23. The computer-readable storage medium of claim 18, wherein the message is transmitted using a short message service.

24. The computer-readable storage medium of claim 18, wherein the plurality of instructions further comprise functionality to:

receive subscriber data associated with the user of the mobile device, wherein subscriber data comprises a mobile device identifier and a personal identifier associated with the user;

receive a taxpayer identifier of the user; and store subscriber data and the taxpayer identifier in a repository.

25. The computer-readable storage medium of claim 24, wherein subscriber data is received in a markup language request.

26. The computer-readable storage medium of claim 24, wherein the plurality of instructions further comprise functionality to:

identify the tax form based on a plurality of transaction data stored in the repository.

27. The computer-readable storage medium of claim 18, wherein the plurality of instructions further comprise functionality to:

receive, by the mobile device, a business reimbursement form comprising a summary of a plurality of tax-related expenses of the user transacted over a pre-defined time period.

28. The computer-readable storage medium of claim 18, wherein the plurality of instructions further comprise functionality to:

generate an expense reimbursement form based on the message.

29. A system for submitting tax-related data of a user, comprising:

a mobile device comprising a processor and configured to:

obtain a first electronic image of a receipt for a financial transaction, wherein the receipt comprises a financial amount associated with a tax-related expense of the user;

obtain a second electronic image of at least one person involved in the financial transaction;

receive, from the user, input identifying a deduction category for the financial amount;

display a tax form populated with a tax deduction amount on a display screen of the mobile device; and obtain, from the user and prior to filing the tax form with a taxing authority, an approval of the tax form populated with the tax deduction amount;

a transaction management service (TMS) configured to:

receive, from the mobile device, a message comprising the financial amount, the deduction category, the first electronic image, and the second electronic image; and store the second electronic image as support information for the financial transaction;

a tax preparation application configured to:

calculate, after receiving the message, the tax deduction amount for the deduction category based on the financial amount;

populate a field on the tax form for reporting the tax-related expense with the tax deduction amount; and electronically file a tax return of the user, wherein the tax return is completed using the tax form.

30. The system of claim 29, wherein the mobile device is further configured to:

receive a business reimbursement form comprising a summary of a plurality of tax-related expenses of the user transacted over a pre-defined time period.

31. The system of claim 29, wherein the tax preparation application comprises the TMS.

32. The system of claim 29, wherein the TMS is further configured to generate a form associated with the user, wherein the form is generated based on the message.

33. The system of claim 32, wherein the form confirms receipt of the message from the mobile device.

34. The system of claim 29, wherein the deduction category is business expenses.

35. The system of claim 29, wherein the TMS is further configured to:

receive subscriber data associated with the user, wherein subscriber data comprises a mobile device identifier and a personal identifier corresponding to the user;

receive a taxpayer identifier of the user; and store subscriber data and the taxpayer identifier in a repository.

36. The system of claim 29, wherein the message further comprises an activity description.

37. The system of claim 29, wherein the mobile device is further configured to:

record an audio file describing the tax-related expense, wherein the message further comprises the audio file.

38. The system of claim 29, wherein the mobile device is further configured to:

record an video file describing the tax-related expense, wherein the message further comprises the video file.

39. The system of claim 29, wherein the mobile device comprises a mobile device identifier associated with the user.

40. The system of claim 29, wherein the message is transmitted using a short message service.

41. The system of claim 29, wherein the TMS is further configured to:

generate an expense reimbursement form based on the message.

* * * * *